April 16, 1935. A. N. SPANEL 1,997,877
DENTAL CLEANER
Filed Oct. 6, 1933
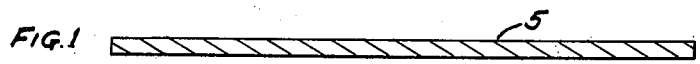
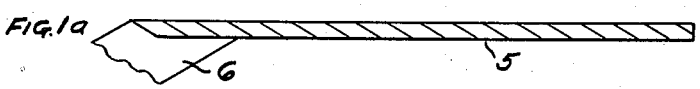
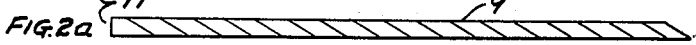
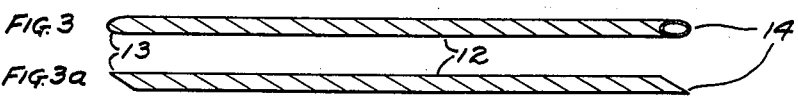
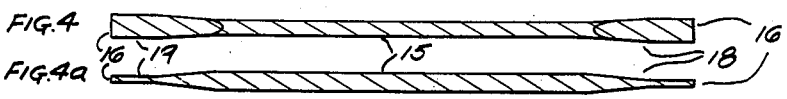
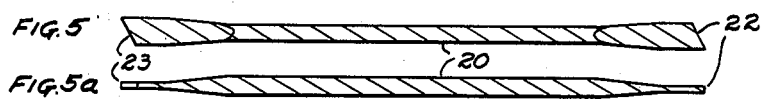
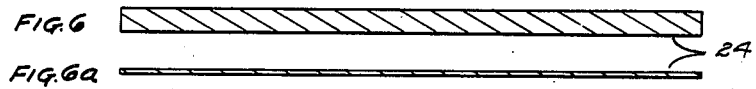
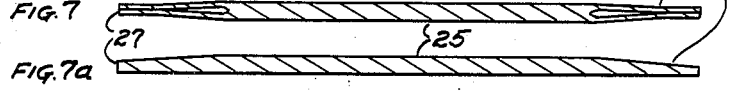
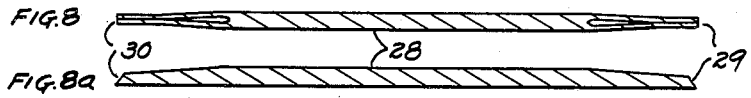
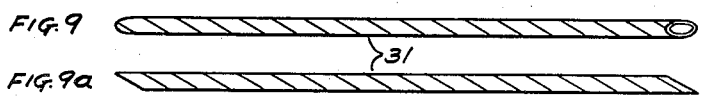
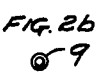
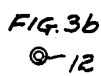
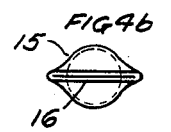
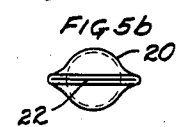
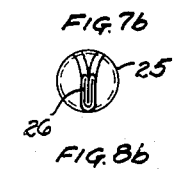
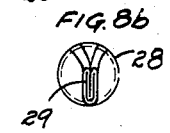
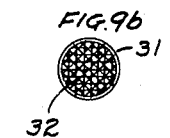
INVENTOR
ABRAHAM N. SPANEL
BY
D. Clyde Jones
ATTORNEY Patented Apr. 16, 1935

1,997,877

UNITED STATES PATENT OFFICE 1,997,877

DENTAL CLEANER

Abraham N. Spánel, Rochester, N. Y.

Application October 6, 1933, Serial No. 692,408

14 Claims. (Cl. 132—89)

This invention relates to a dental cleaner which is adapted to serve the purpose of both a toothpick and of dental floss.

With former dental cleaners such as dental floss which is made of textile material, the fibers easily become separated from the body of the floss and frequently collect between the teeth and are removed only with difficulty. Dental cleaners in the form of toothpicks are commonly made of wood, which splinters easily with the result that the splinters may become lodged between the teeth and on occasion may enter the gum tissue and cause serious results. However, when toothpicks are made of bone, quills or metal, they may injure the enamel of the teeth or the gum tissue so that they have not been entirely satisfactory. In addition to these disadvantages, toothpicks are not adapted in any way to serve the purpose of dental floss.

In accordance with one feature of the present invention, a dental product is provided which serves not only as a tooth pick, but which also may be used in the same manner as dental floss to remove food particles or other substance adhering to the teeth.

Another feature of the invention relates to a helically wound dental cleaner.

A further feature of the invention relates to a dental cleaner which is formed of moisture resistant cellulosic material.

Still another feature of the invention relates to a tubular dental cleaner of cellulosic material which is filled with solid material.

These and other features of the invention will appear from the detailed description and the claims when taken with the drawing in which Fig. 1 is a side view, Fig. 1a is a side view of a partially completed cleaner, and Fig. 1b is an end view of one form of the cleaner of the present invention; Figs. 2 and 2a are respectively different side views of another form of cleaner in which one end is cut on the bias and Fig. 2b is an end view thereof; Figs. 3 and 3a illustrate different side views of still a different form of the invention in which both ends of the cleaner are cut on the bias and Fig. 3b is an end view thereof; Figs. 4 and 4a are different side views and Fig. 4b is an enlarged end view showing a cleaner with square ends and with the end portions flattened; Figs. 5 and 5a represent a side view and Fig. 5b an enlarged end view of still another type of cleaner of which the end portions are flattened with the ends of these portions cut on the bias; Figs. 6 and 6a represent different side views and Fig. 6b an end view of still a different form of cleaner which is flattened throughout its length; Figs. 7 and 7a illustrate different side views and Fig. 7b an enlarged end view of a cleaner in which the end portions are folded into U-shaped form; Figs. 8 and 8a illustrate side views and Fig. 8b an end view of still a different type of cleaner having U-shaped end portions with the ends of these portions cut on the bias; Figs. 9 and 9a illustrate different side views and Fig. 9b an end view of a cleaner similar to that shown in Fig. 1 but which is filled with a solid material.

Referring especially to Figs. 1 and 1a, there is illustrated a dental cleaner generally designated 5 which is made of a strip 6 of cellulosic material such as paper, cellulose nitrate or cellulose acetate helically wound upon itself as indicated in Fig. 1b with overlapping portions adhesively joined together to form a hollow tube. The material of the strip is preferably water-resistant or waterproof and is of such characteristics that the cleaner has a substantial degree of rigidity so that it can be used as a tooth pick and yet will flatten easily as it is drawn between the teeth. Since the toothpick is made from a strip wound helically with parts overlapping, the exposed helical edges of the strip serve to engage the food lodged between the teeth and readily remove it therefrom.

The cleaner 9 shown in Figs. 2, 2a and 2b is similar to that shown in Figs. 1 and 1a, except that one end of this last-mentioned cleaner is cut on the bias as indicated at 10 while the other end thereof is square as shown at 11.

The modified form of the cleaner 12 illustrated in Figs. 3, 3a and 3b differs from the foregoing forms in that both of its ends 13 and 14 are cut on the bias.

In the form of the invention disclosed in Figs. 4, 4a and 4b, the cleaner 15 has square ends 16 and 17, but each of its end portions 18 and 19 are flattened.

The cleaner 20 shown in Figs. 5, 5a and 5b, is substantially similar to that just described, except that its ends 22 and 23 are cut on the bias.

Figs. 6, 6a and 6b show a cleaner 24 formed of wrapped layers of one or more cellulosic strips which cleaner has been flattened during the manufacture thereof, as best indicated in Figs. 6a and 6b to provide a cleaner which can be easily inserted between the teeth.

The cleaner 25 shown in Figs. 7, 7a and 7b is similar to that shown in Fig. 1 except that the end portions 26 and 27 thereof have been folded into U-shaped form as best indicated in Fig. 7 to increase the rigidity of the end portions of the cleaner.

The cleaner 28 of Figs. 8, 8a and 8b is similar to that illustrated in the last-mentioned figures, except that the extreme ends of the U-shaped end portions are cut on the bias as indicated at 29 and 30.

The cleaner 31 shown in Figs. 9, 9a and 9b is similar to that disclosed in Figs. 3, 3a and 3b, but differs therefrom in that the cleaner is filled with a solid material 32 which may be introduced into the hollow cleaner in liquid form and yet solidifies quickly. A high melting paraffine answers this requirement, although other materials may be used.

It will be understood that the dental cleaner of this invention may be made from a wide variety of materials provided that they satisfy the requirements of being water resistant, and of having a substantial degree of rigidity against bending when formed into a tube, while permitting the tube to be sufficiently yielding so that it will collapse into a strip when drawn between the teeth. A few of the possible materials, namely, paper, cellulose nitrate, or cellulose acetate have been referred to. In addition regenerative cellulose (cellophane) and glassine papers, as well as other similar materials well known to those familiar with that art may be used for making the present cleaner. These materials except paper, above mentioned are for convenience referred to either as a fiberless cellulosic material or as a transparent cellulosic material.

What I claim is:

1. A dental cleaner of uniform thickness throughout its length formed of overlapping layers of equal width arranged on the bias with respect to the principal axis of the cleaner.

2. A dental cleaner formed of overlapping layers of a helically wound uniform width strip of transparent cellulosic material.

3. A hollow dental cleaner formed of overlapping layers of a uniform width strip of cellulose material with the contiguous surfaces of said layers adhesively joined together.

4. A hollow wound dental cleaner having at least one end which is U-shaped in cross-section.

5. A flat dental cleaner formed of helically wound layers of fiberless cellulosic material.

6. A flat dental cleaner formed of helical wound layers comprising at least one strip of cellulosic material.

7. A dental cleaner of uniform diameter throughout its length, said cleaner being formed of helically wound cellulosic material and having at least one end cut on the bias.

8. A dental cleaner of such characteristics that it has a substantial degree of rigidity and yet will collapse as it is drawn between the teeth, said cleaner being formed of helically wound layers of uniform width.

9. A hollow dental cleaner having dimensions comparable with those of the usual commercial wooden toothpick and having such characteristics that it will collapse as it is drawn between the teeth, said cleaner being formed of a helically wound strip of cellulosic material.

10. A dental cleaner of such dimensions and such characteristics that it has a substantial degree of rigidity and yet will collapse as it is drawn between the teeth, said cleaner being formed of layers of a strip the long axis of which extends helically around the principal axis of the cleaner.

11. A hollow wound dental cleaner of such characteristics that it has a substantial degree of rigidity and yet will collapse as it is drawn between the teeth, said cleaner having a uniform diameter throughout its length and being provided with exposed helical edges present in its outer surface throughout its length.

12. A helically wound dental cleaner of tubular form having its dimensions comparable with those of the usual commercial wooden toothpick, said cleaner having a filling of solid material.

13. A helically wound dental cleaner with flattened ends, said cleaner being formed of fiberless cellulosic material.

14. A helically wound dental cleaner with flattened ends, cut on the bias, said cleaner being formed of cellulosic material.

ABRAHAM N. SPÁNEL.